(12) United States Patent
Ishibashi et al.

(10) Patent No.: US 10,731,763 B2
(45) Date of Patent: Aug. 4, 2020

(54) VALVE ELEMENT AND HIGH-TEMPERATURE-ORIENTED VALVE

(71) Applicant: FUJIKIN INCORPORATED, Osaka-shi (JP)

(72) Inventors: Keisuke Ishibashi, Osaka (JP); Michio Yamaji, Osaka (JP); Tsuyoshi Tanikawa, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 0 days.

(21) Appl. No.: 15/118,212

(22) PCT Filed: Feb. 18, 2015

(86) PCT No.: PCT/JP2015/054456
§ 371 (c)(1),
(2) Date: Aug. 11, 2016

(87) PCT Pub. No.: WO2015/125828
PCT Pub. Date: Aug. 27, 2015

(65) Prior Publication Data
US 2017/0184204 A1    Jun. 29, 2017

(30) Foreign Application Priority Data
Feb. 20, 2014 (JP) .................... 2014-030411

(51) Int. Cl.
*F16K 1/36* (2006.01)
*F16K 31/122* (2006.01)
*F16K 25/00* (2006.01)

(52) U.S. Cl.
CPC ............. *F16K 1/36* (2013.01); *F16K 25/005* (2013.01); *F16K 31/1221* (2013.01); *F16K 31/1226* (2013.01)

(58) Field of Classification Search
CPC ... F16K 1/36; F16K 1/48; F16K 1/487; F16K 31/1221; F16K 25/005
See application file for complete search history.

(56) References Cited

U.S. PATENT DOCUMENTS

| 1,409,127 | A | * | 3/1922 | Wasem | ..................... F16K 1/14 |
| | | | | | 251/86 |
| 1,485,508 | A | * | 3/1924 | Kiley | ........................ F16K 1/36 |
| | | | | | 251/357 |

(Continued)

FOREIGN PATENT DOCUMENTS

| CN | 1678857 A | 10/2005 |
| CN | 2826095 Y | 10/2006 |

(Continued)

OTHER PUBLICATIONS

International Search Report dated Apr. 7, 2015, issued for PCT/JP2015/054456.

(Continued)

*Primary Examiner* — Marina A Tietjen
(74) *Attorney, Agent, or Firm* — Locke Lord LLP (57) ABSTRACT

A valve element significantly improved in rotation preventing performance of an abutting member formed of a synthetic resin by using a caulking structure and a high-temperature-oriented valve provided with such a valve element. A valve element includes: an abutting member formed of a synthetic resin and configured to close a path opening by coming into abutment with a path opening edge, and a holding member having a recessed portion into which the abutting member is fitted, in which the holding member is caulked and thus the abutting member is held by the holding member. The holding member is provided with a plurality of notches at a portion to be caulked.

10 Claims, 6 Drawing Sheets

(56) References Cited

U.S. PATENT DOCUMENTS

| | | | | |
|---|---|---|---|---|
| 1,651,942 A | * | 12/1927 | Belknap | F16K 1/385 |
| | | | | 251/357 |
| 2,271,391 A | * | 1/1942 | Drake | F16K 1/487 |
| | | | | 251/88 |
| 2,311,009 A | * | 2/1943 | Urquhart | F16K 1/46 |
| | | | | 251/332 |
| 2,348,548 A | * | 5/1944 | Kochler | F16K 1/425 |
| | | | | 251/364 |
| 2,617,621 A | * | 11/1952 | Hobbs | F16K 41/10 |
| | | | | 251/273 |
| 2,619,115 A | * | 11/1952 | Dondero | F16K 17/04 |
| | | | | 137/529 |
| 2,735,047 A | * | 2/1956 | Garner et al. | H01F 7/12 |
| | | | | 251/129.19 |
| 2,740,425 A | * | 4/1956 | Garland | F16K 1/48 |
| | | | | 137/469 |
| 2,861,569 A | * | 11/1958 | Emerson | A62B 9/006 |
| | | | | 128/202.22 |
| 3,356,335 A | * | 12/1967 | Koch | F16K 1/302 |
| | | | | 251/214 |
| 3,831,900 A | * | 8/1974 | Matousek | F16K 1/36 |
| | | | | 251/122 |
| 5,193,577 A | * | 3/1993 | de Koning | F04B 53/102 |
| | | | | 137/516.29 |
| 5,417,373 A | * | 5/1995 | Facchin | F02M 51/0625 |
| | | | | 239/585.3 |
| 5,450,876 A | * | 9/1995 | Reinicke | F16K 31/0651 |
| | | | | 137/312 |
| 5,709,369 A | * | 1/1998 | Hawkins | F16K 1/36 |
| | | | | 251/86 |
| 6,932,322 B2 | * | 8/2005 | Yanaka | F16K 1/38 |
| | | | | 251/332 |
| 6,994,113 B2 | * | 2/2006 | Rousselin | F16K 1/305 |
| | | | | 137/613 |
| 8,297,593 B2 | * | 10/2012 | Muzzo | F16K 1/02 |
| | | | | 251/332 |
| 9,709,998 B2 | * | 7/2017 | Blanchard | G05D 16/0683 |
| 2005/0269534 A1 | | 12/2005 | Tanikawa et al. | |
| 2010/0327208 A1 | * | 12/2010 | Doutt | F16K 11/044 |
| | | | | 251/333 |
| 2011/0030549 A1 | | 2/2011 | Mueller | |
| 2011/0204268 A1 | * | 8/2011 | Pena De Santiago | |
| | | | | F02M 37/0029 |
| | | | | 251/73 |
| 2013/0153056 A1 | * | 6/2013 | Arai | F25B 41/062 |
| | | | | 137/485 |
| 2015/0300498 A1 | * | 10/2015 | Jensen | F16J 15/344 |
| | | | | 305/104 |
| 2015/0377377 A1 | * | 12/2015 | Kainuma | F16K 31/0624 |
| | | | | 137/625.48 |
| 2016/0032818 A1 | * | 2/2016 | Mallett | F02B 37/183 |
| | | | | 251/318 |

FOREIGN PATENT DOCUMENTS

| | | |
|---|---|---|
| CN | 202955217 U | 5/2013 |
| EP | 2042790 A2 | 4/2009 |
| JP | 01-026936 Y2 | 8/1989 |
| JP | 02-060772 U | 5/1990 |
| JP | 3020569 U | 2/1996 |
| JP | 08-121615 A | 5/1996 |
| JP | 09-032934 A | 2/1997 |
| JP | 2002-113539 A | 4/2002 |
| JP | 2005-265032 A | 9/2005 |
| JP | 2011-506822 A | 3/2011 |

OTHER PUBLICATIONS

Office Action dated Jun. 1, 2017, issued for the Chinese patent application No. 201580002894.0.
Office Action dated Jan. 4, 2018 issued for corresponding Chinese Patent Application No. 201580002894.0.
Office Action dated Jun. 25, 2018 issued for corresponding Korean Patent Application No. 10-2016-7019420.

\* cited by examiner

VALVE ELEMENT AND HIGH-TEMPERATURE-ORIENTED VALVE

TECHNICAL FIELD

The present invention relates to a valve element and a high-temperature-oriented valve and, specifically, to a valve-element including an abutting member formed of a synthetic resin and a holding member that holds the abutting member and a high-temperature-oriented valve including such a valve element.

BACKGROUND ART

Known examples of valve elements used in valves referred to as a bellows valve and a lift valve include a valve element including a disc-shaped abutting member formed of a synthetic resin configured to close a path opening by coming into abutment with a path opening edge, and a holding member having a recessed portion into which the abutting member is fitted, in which the holding member is caulked and thus the abutting member is held by the holding member (Patent Literature 1).

In such a valve element, when the valve is subjected to a temperature cycle (repetition of high temperature→low temperature→high temperature), the abutting member formed of a synthetic resin repeats relatively large expansion and contraction. Therefore, a pressing force that the abutting member applies to the holding member repeats pressurization when expanded and decompression when contracted, so that a force of a peripheral wall that forms a recessed portion of the holding member to press the abutting member is reduced, and hence a gap is formed between the holding member and the abutting member, which may cause a state in which the abutting member is rotatable (slidable) with respect to the holding member.

When the abutting member is allowed to rotate, problems such as lowering of sealing properties due to rotation or particles generated by the sliding motion occurring at the time of relative rotation may arise, and in some cases, the abutting member may drop off from the holding member.

CITATION LIST

Patent Literatures

PTL 1: JP-UM-B-1-26936

SUMMARY OF THE INVENTION

Technical Problem

According to the valve element of the aforesaid PTL 1, since a holding member is caulked, a rotation preventing force with respect to the abutting member is increased compared with a case where an abutting member formed of a synthetic resin is fitted to the holding member by press fitting. However, there is a problem that if a operating temperature of the valve reaches high temperatures on the order of 200° C., for example, rotation of the abutting member with respect to the holding member cannot be prevented even with the caulking structure. In order to employ a rotation preventing structure instead of the caulking structure, new problems such that dimension changing is required may arise.

It is an object of the present invention to provide a valve element significantly improved in rotation preventing performance of an abutting member formed of a synthetic resin by using a caulking structure and a high-temperature-oriented valve provided with such a valve element.

Means for Solving Problems

A valve element according to the present invention includes: an abutting member formed of a synthetic resin and configured to close a path opening by coming into abutment with a path opening edge; and a holding member having a recessed portion into which the abutting member is fitted, the holding member being caulked and thus the abutting member being held by the holding member, and is characterized in that at least one notch is provided at a portion of the holding member to be caulked.

The valve element according to the present invention includes: an abutting member formed of a synthetic resin and configured to close a path opening by coming into abutment with a path opening edge; and a holding member having a recessed portion into which the abutting member is fitted, the holding member being caulked and thus the abutting member being held by the holding member, and is characterized in that at least one notch is provided at a portion of the holding member to be caulked, the abutting member has a circular contour line at a position of the notch on a cross section vertical to a direction of fitting of the abutting member to the holding member before caulking, and a distance from a center of the circle to one point on the contour line of the cross section after caulking is different from a distance from the center of the circle to another point on the contour line.

The notch provided on the holding member of the valve element according to the present invention includes an insection, a hole, a recess, and a groove.

The holding member is formed of, for example, stainless steel. A peripheral surface (an inner peripheral surface of a peripheral wall of the holding member) of the recessed portion of the holding member is a cylindrical surface corresponding to an outer peripheral surface of the abutting member, and a notch is added to a peripheral surface of the recessed portion, which is a simple cylindrical surface in the related art. The notch may be provided so as to penetrate through the peripheral wall of the holding member, or may be formed into a groove shape to leave an outer periphery of the holding member remained. The number of the notches may be one, or a plurality of the notches may be provided in a circumferential direction. The outer peripheral surface of the holding member is, for example, the cylindrical surface, but is not limited thereto.

According to caulking in the related art, only a distal end portion of the cylindrical shape is caulked. Therefore, the cylindrical shape is maintained even after caulking, and a rotation preventing force against the rotation is only a frictional force. Therefore, even though the degree of caulking is increased, enhancement of the rotation preventing force is limited.

According to the present invention, caulking the holding member (a cylindrical member provided with a notch) causes a portion of the abutting member corresponding to a portion having no notch to be reduced in diameter together with the holding member, and a portion of the abutting member corresponding to a portion having the notch not to be reduced in diameter. Therefore, a step is formed on the outer peripheral surface of the abutting member, and the step on the abutting member comes into abutment with the wall surface of the holding member having the notch, so that a rotation preventing force in association with engagement (a mechanical force generated by engagement) is generated against the rotation of the abutting member in addition to the frictional force.

Preferably, a plurality (more preferably, 2 to 4) of the notches are provided at required intervals in a circumferential direction.

The valve element of the present invention may have the same abutting member as those in the related art, and processes except for forming additional notches on the holding member may be used without change. Dimensions of the holding member (the diameter or an outer diameter of the recessed portion) need not to be changed. Therefore, rotation preventing function may be significantly enhanced while reducing costs.

The valve element of the present invention is suitable to be used at temperatures exceeding 140° C. When used at high temperatures, the abutting member formed of a synthetic resin is subjected to a temperature cycle (repetition of high-temperature→low temperature→high temperature), so that a rotation preventing force generated by caulking may be lowered in an early stage. The valve element of the present invention, being improved significantly in rotation preventing force function, is capable of preventing the rotation of the abutting member for a long term even at such high temperatures.

Examples of the synthetic resin used as a material of the abutting member include fluorine-based resin such as PTFE, PFA, and PEEK material (Polyether Ether Ketone resin).

A high-temperature-oriented valve of the present invention includes a valve box provided with a fluid channel; and a valve element that opens and closes the fluid path, and is characterized in that the valve element is the above-described valve element.

Such a valve includes a valve referred to as "bellows valve" provided with a bellows as a sealing member. However, the valve is not limited thereto, and the above-described valve element may be applied to various types of valves.

A valve seat of the aforesaid high-temperature-oriented valve may be integrally provided with a valve box (in this case, the valve seat is formed of metal such as stainless steel), and may be formed separately from the valve box (in this case, and the valve seat may be formed of metal such as stainless steel, or may be formed of a synthetic resin). The synthetic resin which serves as a material of the valve seat may be the same as, and different from, the abutting member.

Advantageous Effects of Invention

According to the valve element of the present invention, caulking the holding member causes the portions of the abutting member corresponding to the portions without notch to be reduced in diameter together with the holding member, and the portions of the abutting member corresponding to the portions with the notches not to be reduced in diameter. Therefore, a step is formed on an outer peripheral surface of the abutting member, and the step of the abutting member comes into abutment with the wall surface of the holding member provided with notches and thus the significant rotation preventing force against the rotation of the abutting member is generated. Therefore, with the caulking structure, the rotation preventing function of the abutting member formed of a synthetic resin is significantly enhanced.

DETAIL DESCRIPTION OF INVENTION

Embodiments of the present invention will be described below with reference to drawings.

FIG. 1 to FIG. 6 illustrate an embodiment of a valve element according to the present invention and a valve provided with such a valve element.

Figure 1:
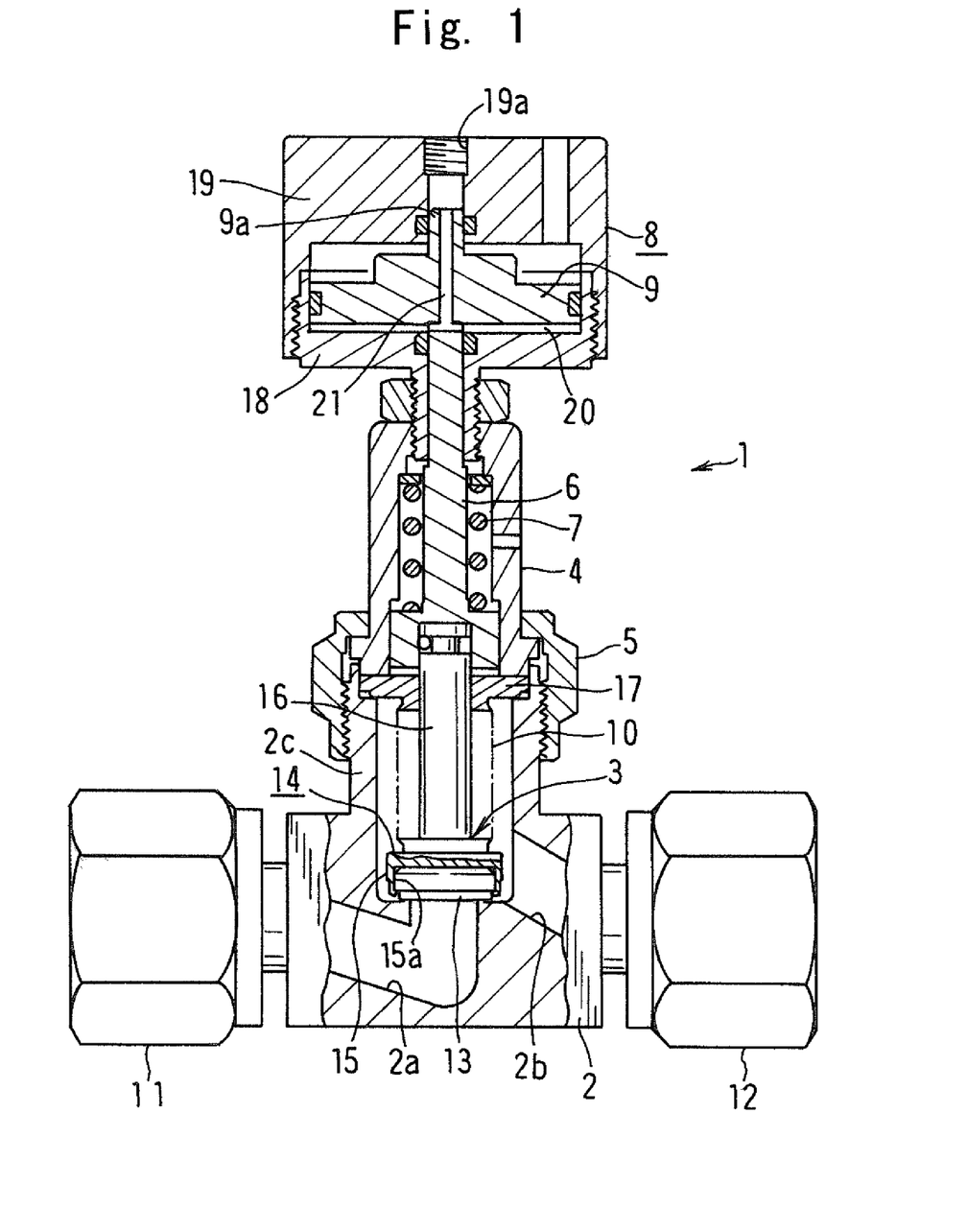
FIG. 1 is a vertical cross-sectional view of an embodiment in which a valve element of the present invention is applied to a bellows valve and illustrating a closed state.

A valve (1) is referred to as a bellows valve, and includes: a valve box (2) provided with a fluid inflow path (2a) and a fluid outflow path (2b); a valve element (3) that opens and closes the fluid inflow path (2a) by being pressed against or being separated from a peripheral edge of the fluid inflow path (2a); a bonnet (4) fixed to an upper side of the valve box (2) by a bonnet nut (5); a valve rod (6) having the valve element (3) fixed to a lower end thereof and disposed in the bonnet (4) so as to be movable upward and downward; a helical compression spring (biasing member) (7) that biases the valve rod (6) downward; a cylindrical casing (8) provided on an upper side of the bonnet (4); a piston (9) provided integrally with part of the valve rod (6) protruding upward from the bonnet (4) and disposed in the casing (8) so as to be movable upward and downward; and a bellows (10) that prevents a fluid from flowing toward the valve element (3).

The valve box (2) is formed of stainless steel, and includes a cylindrical upward projecting portion (2c). A male screw portion to be screwed into the bonnet nut (5) is formed on the upward projecting portion (2c). The valve box (2) includes an inlet side tube joint (11) for connecting the fluid inflow path (2a) and an outer piping, and an outlet side tube joint (12) for connecting the fluid outflow path (2b) and the outer piping.

Figure 3:
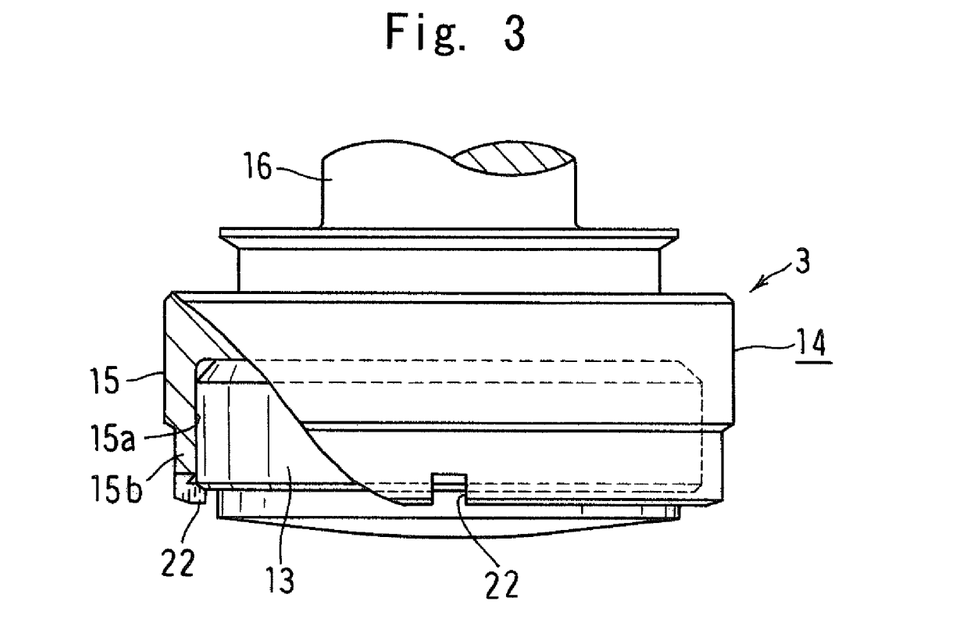
FIG. 3 is a partly breakaway front view illustrating the valve element according to the present invention.

The valve element (3) includes an abutting member (13) that comes into abutment with an opening edge of the fluid inflow path (2a) and closes an opening of the fluid inflow path (2a), and a holding member (14) that holds the abutting member (13) as illustrated in FIG. 3.

Figure 4:
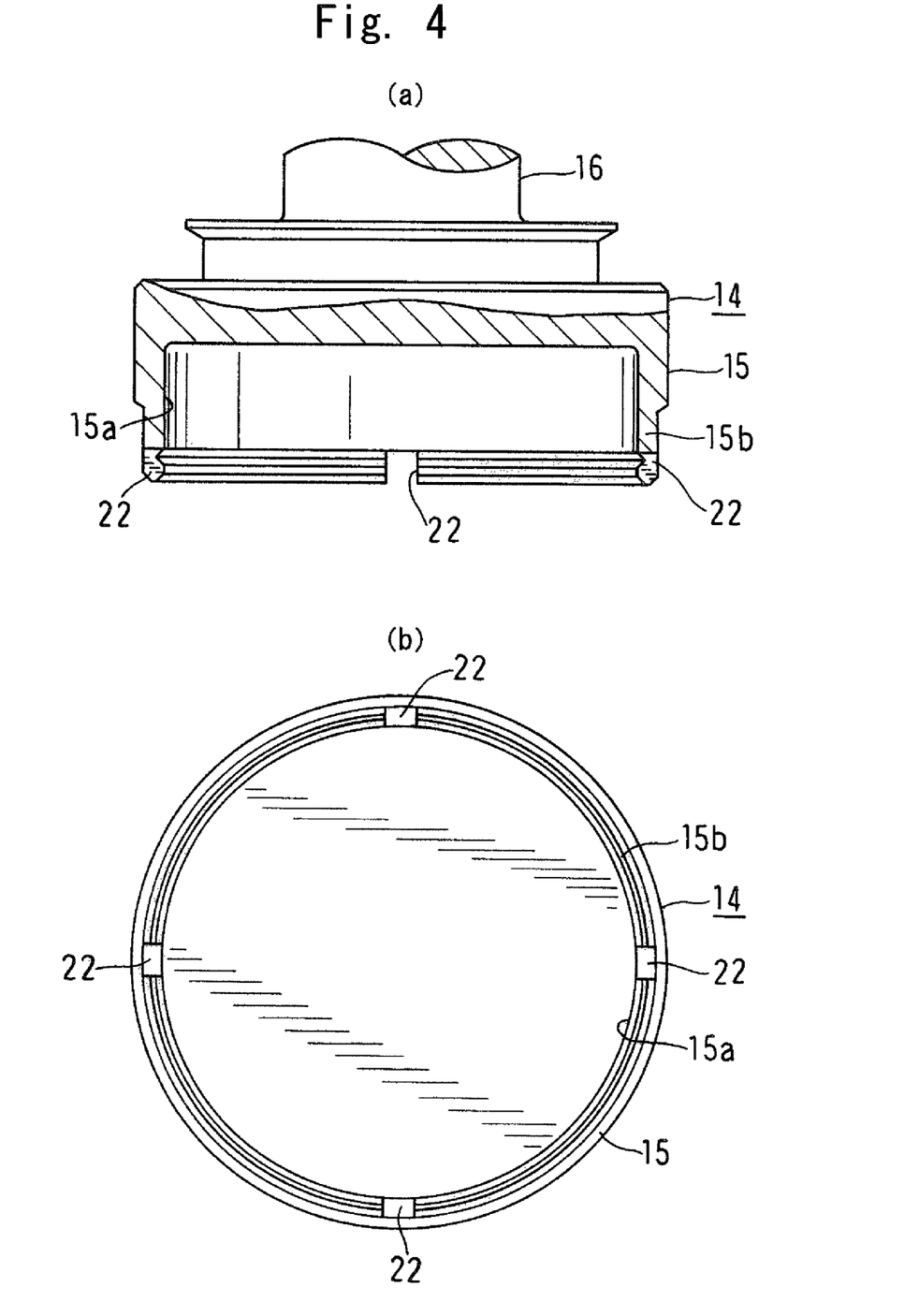
FIG. 4 illustrates a holding member of the valve element of the present invention in which (a) is a vertical cross-sectional view and (b) is a bottom view.

The holding member (14) is formed of stainless steel, and includes a large-diameter shaft portion (15) located on the lower side and a small-diameter shaft portion (16) extending upward from the large-diameter shaft portion (15) as illustrated also in FIG. 4.

Figure 5:
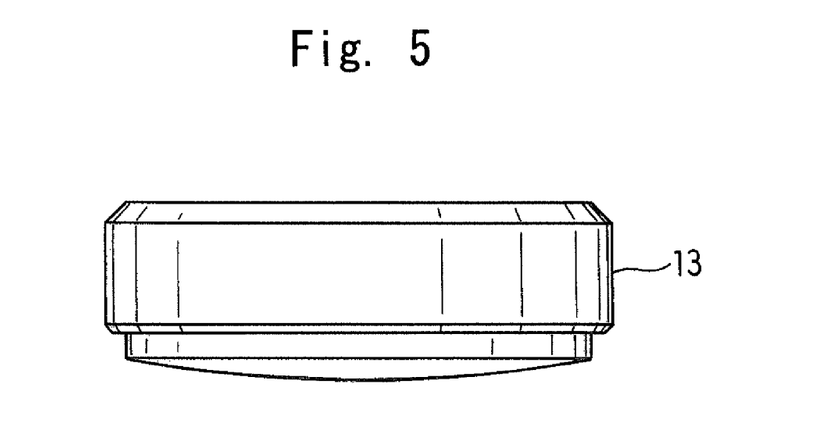
FIG. 5 is a front view illustrating an abutting member of the valve element of the present invention.

The abutting member (13) is also referred to as a disk packing, formed of a synthetic resin, and has a disc shape as illustrated in FIG. 5. A synthetic resin as a material of the abutting member (13) may be a fluorine-based resin such as PTFE and PFA, for example, and maybe PEEK material (Polyether Ether Ketone resin) for enhancing corrosive properties with respect to ammonia and the like.

The large-diameter shaft portion (15) of the holding member (14) is formed into a step shape having a larger diameter on a lower portion thereof, and the lower portion of the large-diameter shaft portion (15) is provided with a recessed portion (15a) opening downward and allowing the abutting member (13) to fit therein.

The small-diameter shaft portion (16) of the holding member (14) is fixed at an upper end portion thereof to a lower end portion of the valve rod (6), whereby the valve element (3) is moved integrally with the valve rod (6) upward and downward.

A bellows fixing ring (17) is fixed to the holding member (14) at a portion near an upper end of the small-diameter shaft portion (16), and the bellows (10) is disposed between the fixing ring (17) and an upper surface of the large-diameter shaft portion (15) of the holding member (14).

The bellows (10) is manufactured by punching a metal into a disk shape to form a fine wave-shaped plate, for example, and welding an inner periphery and an outer periphery of the wave-shaped plate.

The casing (8) includes a lower casing (18) and an upper casing (19) connected to the lower casing (18), and an arrangement space for the piston (9) is defined by a bottom wall of the lower casing (18) and a top wall of the upper casing (19). A space between a lower surface of the piston (9) and the bottom wall of the lower casing (18) corresponds to a compressed air introducing chamber (20).

A through passage (19a) for introducing compressed air is formed on the top wall of the upper casing (19). The piston (9) includes an upward projecting portion (9a) to be fitted into a lower end portion of the through passage (19a), and the piston (9) is provided with a compressed air introducing path (21) that extends downward from an upper end of the upward projecting portion (9a) and communicates with the compressed air introducing chamber (20).

Figure 2:
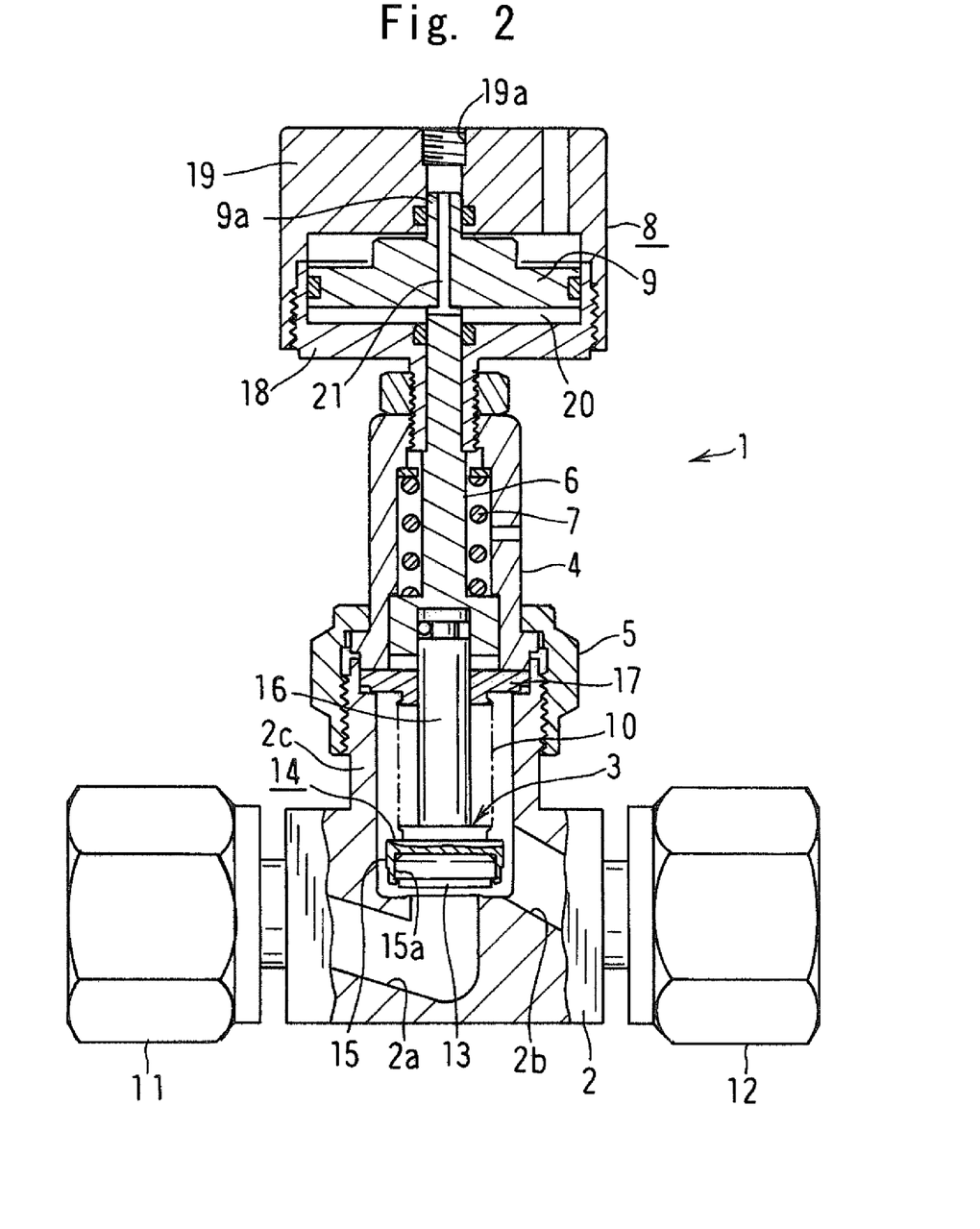
FIG. 2 is a drawing corresponding to FIG. 1 illustrating an open state.

In a state in which no compressed air is introduced into the compressed air introducing chamber (20), the valve (1) takes a closed state in which the abutting member (13) of the valve element (3) comes into abutment with the opening edge of the fluid inflow path (2a) and closes an opening of the fluid inflow path (2a) by a downward biasing force of the helical compression spring (7) as illustrated in FIG. 1. When compressed air is introduced into the compressed air introducing chamber (20) via the through passage (19a) of the top wall of the upper casing (19) and the compressed air introducing path (21) of the piston (9), the piston (9), the valve rod (6) integral with the piston (9), and the valve element (3) fixed to the valve rod (6) move integrally upward, whereby an opening state in which the abutting member (13) of the valve element (3) comes apart from the opening edge of the fluid inflow path (2a) to open the opening of the fluid inflow path (2a) as illustrated in FIG. 2 is obtained. The through passage (19a) provided on the casing (8) is formed on the top wall of the upper casing (19) in this example, and this path may be formed on a side wall of the upper casing (19) or the lower casing (18) as a matter of course.

The aforesaid valve element (the valve element according to the present invention) (3) is caulked at a lower end portion of a peripheral wall (15b), which constitutes the recessed portion (15a) of the large-diameter shaft portion (15) of the holding member (14) (plastically deformed by being applied with a force directed from outside toward inside in a radial direction), so that the abutting member (13) is held by the holding member (14). Here, as illustrated in FIG. 3 and FIG. 4, at least one (four in the illustrated embodiment) notch (22) is provided on the lower end portion of the peripheral wall (15b) of the large-diameter shaft portion (15), in other words, a portion of the holding member (14) to be caulked. The notch (22) is provided equidistantly in a circumferential direction.

In FIG. 3, when the lower end portion of the peripheral wall (15b) of the large-diameter shaft portion (15) of the holding member (14) is caulked, the abutting member (13) is compressed in accordance with caulking. Here, portions of the abutting member (13) corresponding to portions of the notches (22) are not compressed, a relationship: the diameter of the recessed portion (15a) of the holding member (14)=an outer diameter of a caulking portion (13a) of the abutting member (13)<the outer diameter of a non-caulking portion (13b) of the abutting member (13) is satisfied as illustrated schematically in FIG. 6. Accordingly, steps (13c) (13d) are formed on the abutting member (13) (exaggerated in the drawing), and wall surfaces (22a) (22b) of the notch (22) engage the steps (13c) (13d) from the circumferential direction.

Figure 6:
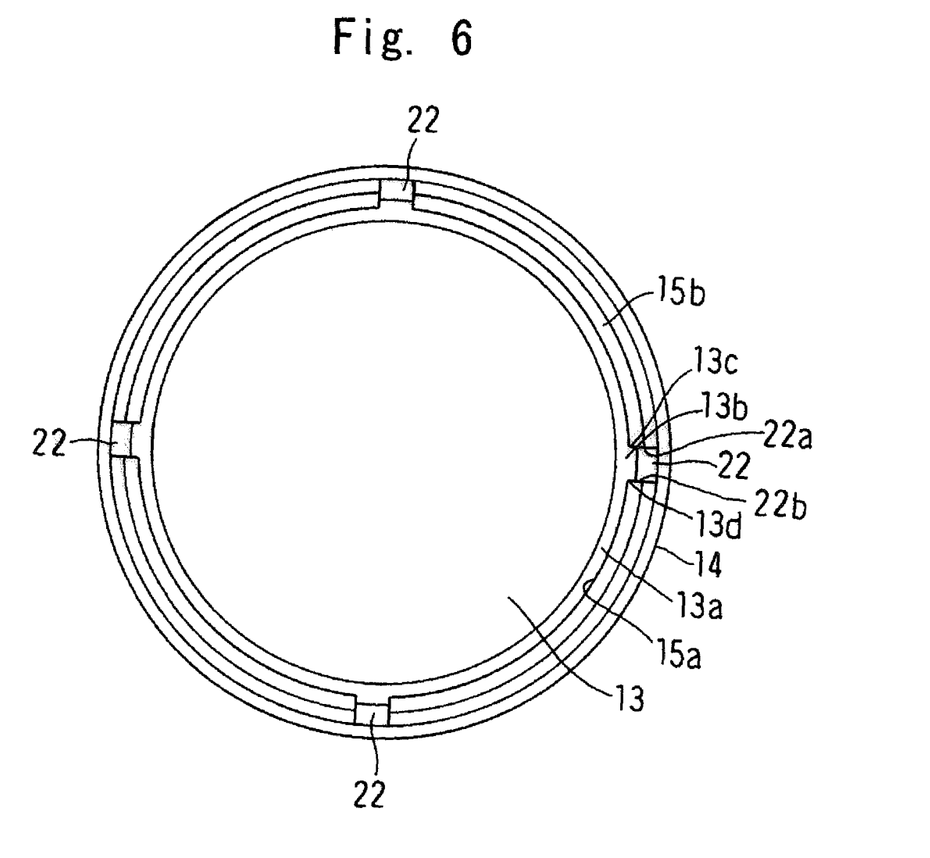
FIG. 6 is a bottom view schematically illustrating a caulked state of the valve element of the present invention.

In other words, for a counterclockwise rotation of the abutting member (13), the wall surface (22a) of the notch (22) on a side of a counterclockwise direction engages the step (13c) of the abutting member (13) on the side of the counterclockwise direction by serving as a stopper to generate a rotation preventing force, while for a clockwise rotation of the abutting member (13), the wall surface (22b) on the side of the clockwise direction of the notch (22) engages the step (13d) of the abutting member (13) on the side of the clockwise direction while serving as a stopper to generate the rotation preventing force. In this manner, the rotation of the abutting member (13) with respect to the holding member (14) is prevented.

The aforesaid valve element (3) and the valve (1) are suitable to be used at temperatures exceeding 140° C. At such a high temperature, the abutting member (13) formed of a synthetic resin is subjected to a temperature cycle (repetition of high-temperature→low temperature→high temperature), so that the rotation preventing force generated by caulking may be lowered in an early stage in the related art. The aforesaid valve element (3), being improved significantly in rotation preventing force function by the notches (22), is capable of preventing the rotation of the abutting member (13) for a long term even at such high temperatures. In particular, when PEEK material is used for the abutting member (13), lowering of resiliency at high temperatures may occur. However, a combination of the aforesaid valve element (3) and the PEEK material may be suitable for a high-temperature oriented service.

In the caulked state illustrated in FIG. 6, the notch (22) only needs to be formed so that the steps (13c) (13d) are provided on the abutting member (13). Therefore, the shape and the number are not limited to those illustrated. For example, the notch may be formed into a groove shape on an inner periphery of the peripheral wall (15b) of the large-diameter shaft portion (15) of the holding member (14) so as to leave an outer periphery of the holding member (14) remained.

In the configuration described above, the bellows valve has been exemplified as the valve (1). However, the aforesaid valve element (3) may be used for valves which do not have the bellows as a matter of course. The valve seat that receives the abutting member (13) may be provided integrally with the valve box (2), and thus may be formed as a separate member from the valve box (2).

Figure 7:
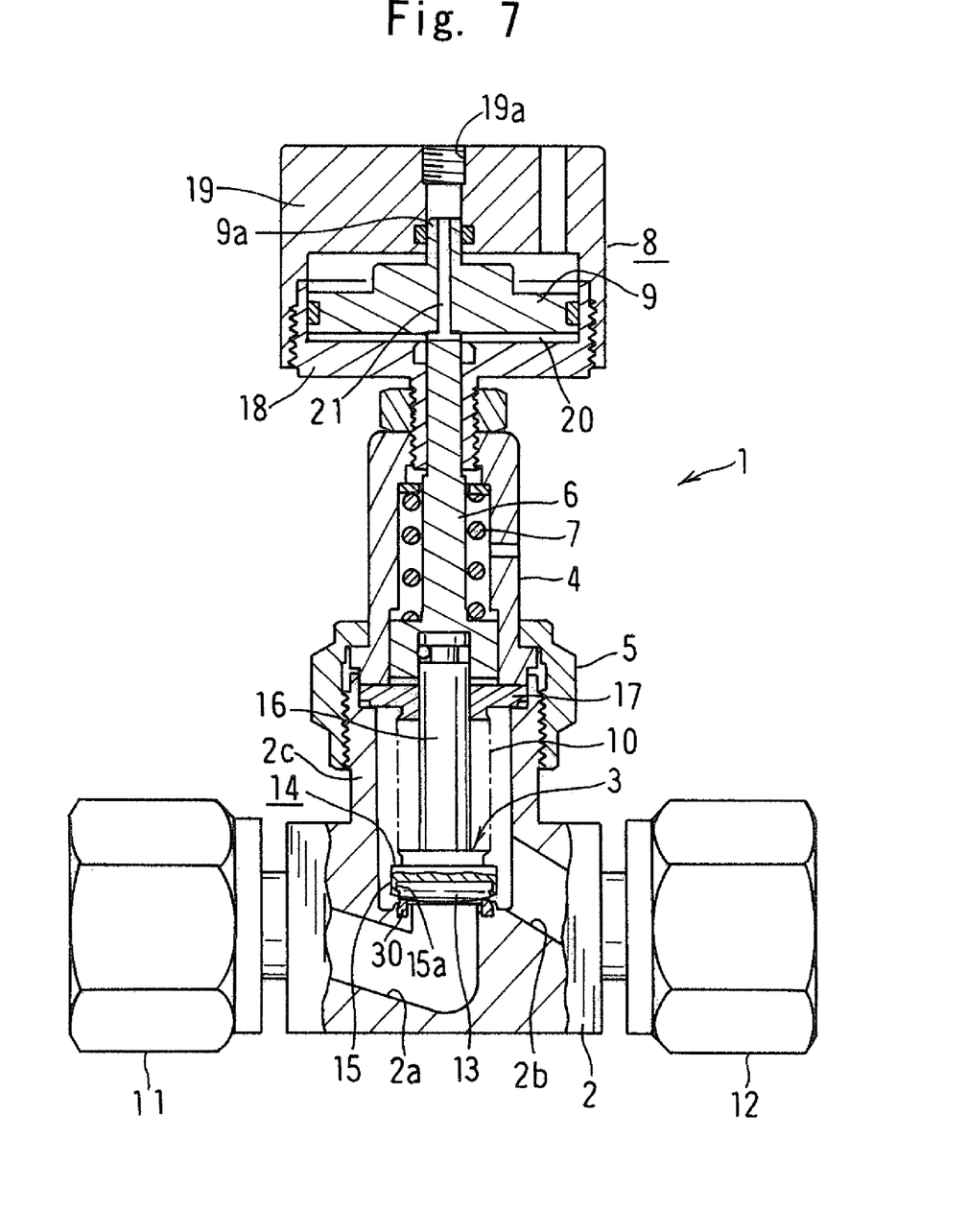
FIG. 7 is a vertical cross-sectional view illustrating an embodiment in which the valve element of the present invention is applied to another valve.

An embodiment in which a valve seat (30) is configured as a separate member from the valve box (2) is illustrated in FIG. 7. In the following description, the same configurations as FIG. 1 are denoted by the same reference numerals, and the description will be omitted.

In FIG. 7, the annular valve seat (30) formed of a synthetic resin is provided on the valve box (2) so as to be positioned on a peripheral edge of the fluid inflow path (2a). The abutting member (13) formed of a synthetic resin of the valve element (3) opens and closes the fluid inflow path (2a) by coming into or out of abutment with the annular valve seat (30).

In the embodiment illustrated in FIG. 1, the abutting member (13) formed of a synthetic resin comes into contact with the valve box (2) formed of stainless steel, while in the embodiment illustrated in FIG. 7, the abutting member (13) formed of a synthetic resin comes into contact with the valve seat (30) formed of a synthetic resin.

The synthetic resin as a material of the valve seat (30) may be a fluorine-based resin such as PTFE and PFA, for example, and maybe PEEK material (Polyether Ether Ketone resin) for enhancing corrosive properties with respect to ammonia and the like.

Other configurations may be modified in accordance with the usage of the valve seat (30) formed of a synthetic resin as a matter of course. In addition, in the configuration described above, a valve of a so-called normally closed valve is illustrated. However, the valve of a normally opened valve is also applicable as a matter of course.

FIELD OF INDUSTRIAL APPLICATION

As regards the valve element and the high-temperature-oriented valve, in particular, as regards the valve element including the abutting member formed of a synthetic resin, and the holding member holding the same and the high-temperature-oriented valve provided with such a valve element, long life of the valve element of and the high-temperature-oriented valve is realized by providing the valve element significantly improved in rotation preventing performance of the abutting member and the high-temperature-oriented valve provided with such a valve element.

REFERENCE SIGNS LIST

1 . . . valve
2 . . . valve box
2a . . . fluid inflow path
2b . . . fluid outflow path
3 . . . valve element
13 . . . abutting member
14 . . . holding member
15a . . . recessed portion
22 . . . notch
30 . . . valve seat

The invention claimed is:

1. A valve element comprising:
an abutting member formed of a synthetic resin, formed in a cylindrical and disc shape with a convex lower most bottom surface, a portion of the abutting member is compressed in accordance with a presence of caulk applied to a holding member and a portion of the abutting member corresponding to a portion of a notch in a holding member is not compressed thereby forming a step on the abutting member in the location of the abutting member corresponding to the location of the notch in the holding member, the step being engageable with the notch, and the abutting member is configured to close a path opening by coming into abutment with a path opening edge; and the holding member formed in a cylindrical shape and having a recessed portion into which the abutting member is fitted, the holding member has at least one notch formed in a peripheral wall of the recessed portion, the peripheral wall has a portion which is inclined inward and an inner peripheral surface of the peripheral wall of the holding member is unobstructed from an opening of the recessed portion to an end opposite to the opening of the recessed portion in a vertical cross-sectional view.

2. The valve element according to claim 1, characterized in that the notch is an insection, a hole, a recess, or a groove.

3. The valve element according to claim 2, characterized in that a plurality of the notches are provided at required intervals in a circumferential direction.

4. A high-temperature-oriented valve comprising: a valve box provided with a fluid path and a valve element that opens and closes the fluid path and being suitable for being used at high temperatures, characterized in that the valve element is the valve element according to claim 2.

5. The high-temperature-oriented valve according to claim 4, characterized in that an annular valve seat formed of a synthetic resin is provided as a separate member from the valve box is provided at a peripheral edge of the fluid path.

6. The valve element according to claim 1, characterized in that a plurality of the notches are provided at required intervals in a circumferential direction.

7. A high-temperature-oriented valve comprising: a valve box provided with a fluid path and a valve element that opens and closes the fluid path and being suitable for being used at high temperatures, characterized in that the valve element is the valve element according to claim 6.

8. A high-temperature-oriented valve comprising: a valve box provided with a fluid path and a valve element that opens and closes the fluid path and being suitable for being used at high temperatures, characterized in that the valve element is the valve element according to claim 1.

9. The high-temperature-oriented valve according to claim 8, characterized in that an annular valve seat formed of a synthetic resin is provided as a separate member from the valve box is provided at a peripheral edge of the fluid path.

10. A method of manufacturing a valve element as recited in claim 1 comprising:
forming an abutting member of a synthetic resin into a disc shape such as to be configured to close a path opening by the abutting member coming into abutment with a path opening edge;

forming a holding member having a recessed portion into which the abutting member is fitted and having at least one notch in the recessed portion for a corresponding portion of the abutting member, fitting the abutting member in the recessed portion of the holding member such that the at least one notch is filled with the corresponding portion of the abutting member; and adding caulk to the holding member at least in an area of the at least one notch.

* * * * *